United States Patent [19]

van der Meulen

[11] 4,156,455

[45] May 29, 1979

[54] METHOD AND APPARATUS FOR CONTROLLING A HEAT TRANSFER INSTALLATION

[76] Inventor: Theo van der Meulen, Petersbergstrasse 4, 5204 Lohmar 21, Fed. Rep. of Germany

[21] Appl. No.: 702,751

[22] Filed: Jul. 2, 1976

[30] Foreign Application Priority Data

Jul. 4, 1975 [DE] Fed. Rep. of Germany ....... 2529858
Jun. 5, 1976 [DE] Fed. Rep. of Germany ....... 2625405

[51] Int. Cl.² .................. G05D 23/00; F24D 3/00; F24J 3/02
[52] U.S. Cl. .................. 165/32; 237/1 A; 126/271
[58] Field of Search ............. 126/270, 271; 237/1 A; 165/32, 2; 236/91 D

[56] References Cited

U.S. PATENT DOCUMENTS

| 3,768,545 | 10/1973 | Wills | 236/91 D |
|---|---|---|---|
| 3,931,806 | 1/1976 | Hayes | 126/400 |
| 3,998,207 | 12/1976 | Watt | 126/271 |
| 4,007,776 | 2/1977 | Alkasab | 237/1 A |
| 4,010,734 | 3/1977 | Chayet | 126/271 |
| 4,027,821 | 6/1977 | Hayes et al. | 126/271 |
| 4,031,880 | 6/1977 | Devin | 237/1 A |
| 4,034,738 | 7/1977 | Barber, Jr. | 237/1 A |

*Primary Examiner*—Ronald H. Lazarus
*Assistant Examiner*—P. S. Lall
*Attorney, Agent, or Firm*—Browdy and Neimark

[57] ABSTRACT

A method of controlling a heating system includes regulating feed temperature of the heat carrying medium as a function of the differential between the feed medium temperature and the return medium temperature, and limiting the lower limit of the temperature of the feed medium to a predetermined minimum. An apparatus for carrying out the method includes first and second thermostats which determine feed and return medium temperatures and a control device responsive to the determined temperatures for adjusting feed medium temperature in accordance with the temperature difference. A further thermostat arrangement, in cooperation with a further control device, is provided for maintaining a minimum feed medium temperature, an auxiliary energy source being controlled by the further control device.

13 Claims, 2 Drawing Figures

METHOD AND APPARATUS FOR CONTROLLING A HEAT TRANSFER INSTALLATION

BACKGROUND OF THE INVENTION

This invention relates to a method of and an apparatus for controlling a heating system particularly a central heating plant, with a circulating heat carrying medium, preferably hot water, circulating at a constant rate.

In the case of central heating plants having a constant rate of hot water circulating, it is already known to regulate the heating water feed temperature by means of an external thermostat as a function of the ambient temperature. However, this method has the disadvantage that the heating plant cannot be controlled in optimum fashion according to the relevant power consumption, so that the rooms heated can easily be over or alternatively under-heated.

SUMMARY OF THE INVENTION

The invention is consequently based on the problem of providing a control technique with which central heating plants can be provided with optimum running as a function of the heat consumed.

According to the invention, this problem is resolved in that the feed temperature is so regulated as a function of the measured temperature differential between feed and return, that the actual temperature differential is equal to an adjustable desired temperature differential or a desired temperature differential pattern, and in such a way that the bottom extreme of the feed temperature is limited by a predetermined minimum temperature.

The invention in effect makes it possible for the feed temperature to adjust itself automatically as a function of the return temperature and according to the heat requirement necessary. The predetermined temperature differential is variable according to the feed temperature and ambient temperature, in keeping with a more or less linear function and is equal to zero at approximately 20° C. feed temperature and ambient temperature. For example, if a temperature differential of 20° is selected for a feed temperature of 90° which is envisaged for example for an ambient temperature of −12°, then automatically the appropriate temperature differentials will be created for the relevant feed temperatures. If, then, for example, the heat requirement is reduced by the fact that the ambient temperature rises and if a temperature differential is created which is less than is preset, then corresponding measures ensure that the feed temperature is reduced until, in keeping with the predetermined values the relevant temperature differential has been established. If, with diminishing energy requirement, the heating water temperatures reach the preset minimum temperature, then the temperature differential control is taken off and replaced by the so-called basic load control.

When the predetermined minimum temperature is reached, as the temperature differential control is removed, the feed temperature is raised and lowered preferably within a predetermined range between the minimum temperature and a preset threshold value.

The apparatus according to the invention, for carrying out the method and particularly for operating a hot water central heating system, is characterised by a thermostat which determines the feed temperature, a thermostat which determines the return temperature, a control device which adjusts the feed temperature according to the temperature differential ascertained, and also at least one basic load thermostat connected to the control device and intended to establish the minimum temperature of the heating water. Preferably, two basic load thermostats are provided and are located in the feed and/or return, to make it possible for the plant to move up and down between the minimum temperature and a higher threshold value. For the adjustment of further programs, for example for night-time or week-end programs, further thermostats may be provided.

In order to adjust the feed temperature, it is expedient to provide a four-way mixing valve which can be operated by means of a motor via the control device.

In order to avoid a spontaneous temperature rise in the feed line, a timing relay to incorporated between the motor and the control device, which ensures that the valve is slowly opened at predetermined intervals of time. The setting of the timing relay is conditioned by the plant, short times being required for a short-circuit while long times are needed for a long circuit.

In order to render the plant more versatile and adaptable, at least one further energy source may be automatically switched on and/or off by means of a temperature differential control system when predetermined bottom or top limit values of the actual temperature differential are reached, in order to raise or lower the feed temperature.

By virtue of this method, it is possible without problem to combine any desired forms of energy with one another. It is possible thereby to use even solar energy, which occurs in varying amounts as a function of the time of day and time of year, in conjunction with conventional forms of energy, to operate any desired heating installations. The values ascertained when sensing the temperature differential between the heating feed and return are used thereby to switch the secondary energy source or sources on or off as required.

For this purpose, the apparatus comprises at least one further energy source, while the control device has an auxiliary means by which the further energy source can be switched on or off when predetermined bottom or top limit values of the actual temperature differential are attained.

As a main energy source, it is possible to provide solar cells by means of which heating water can be heated in a storage container, a conventionally fired heating boiler being provided as the secondary source of energy and being capable of being switched on or off by means of the control device. The heating boiler heat can thereby be transmitted through heat exchanger surfaces directly to the hot water contained in the storage container.

Furthermore, it is possible to provide a storage container for heating water for use and which, like the heating water storage container, can be heated by a main source of energy and a secondary source of energy which can be switched on or off as desired. In this respect, temperature sensors may be provided in the feed and return of the utility water circuit and connected to a second control device, this control device automatically switching the secondary source of energy on or off when the predetermined limit values of temperature differential between feed and return are reached.

It goes without saying that the plant can also be designed solely to provide water for use.

In the same way, the invention is also suited to the utilisation of remote heat. The invention can also be used to operate ventilation plants.

BRIEF DESCRIPTION OF THE DRAWINGS

The invention is described in detail hereinafter with reference to the attached drawings, in which.

DETAILED DESCRIPTION OF THE PREFERRED EMBODIMENTS

Figure 1:
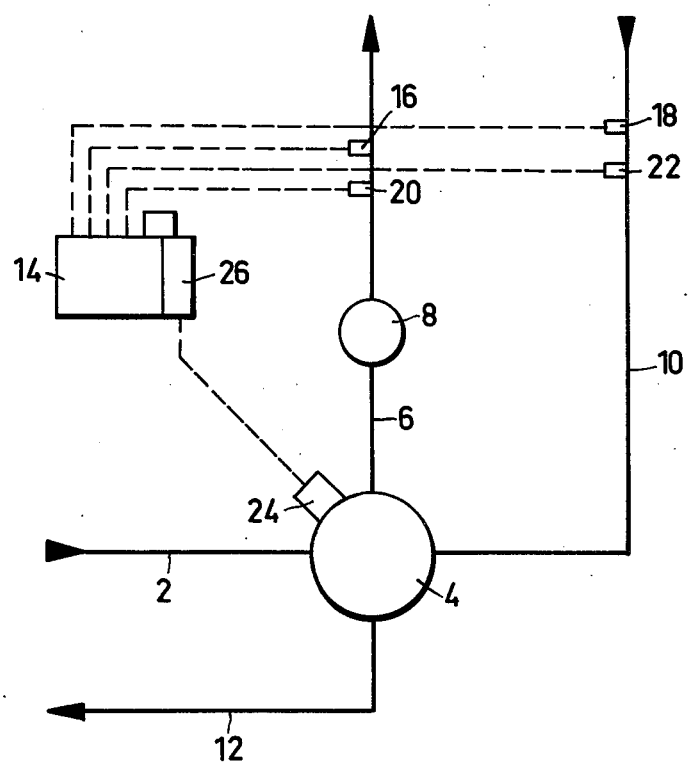
FIG. 1 is a schematic diagram of a control circuit for a hot water central heating plant.

According to FIG. 1 of the drawings, which shows the control circuit for a hot water central heating plant, the heating water arrives through a pipe 2 from a heating boiler, not shown in FIG. 1 fired by coke or oil and producing heating water at a constant temperature. Through a four-way mixing valve 4, the heating water passes into a feed line 6 in which it is forced through the heating system by means of a pump 8. A corresponding return pipe 10 likewise discharged into the mixing valve 4, whence the return water, according to the valve setting, passes through a feed pipe 12 into the heating boiler or is fed back completely or partially into the feed system 6.

The setting of the four-way mixing valve 4 is controlled by the temperature differential between feed water and return water.

The control is effected by means of a control device 14, to which the temperature values are fed through a feed sensor 16 and a return sensor 18. Furthermore, provided in the feed and return are basic load thermostate 20 and 22 which are likewise connected to the control device 14. The control device 14 operates a motor 24 which, once the temperature differential has been ascertained, so adjusts the mixing valve 4 that more or less return water is admixed with the feed. If the preset temperature differential of for example 10° cannot be maintained and the return water is only 8° colder than the feed water. then the valve 4 is so adjusted that a greater portion of the return water is blended with the feed. If, by virtue of a heat drop, the drop in energy becomes so small that the temperature differential control system no longer operates, then all the return is fed into the feed until the circulating heating water reaches the preset minimum temperature which is communicated to the control device 14 by the basic load thermostats. When this minimum temperature is reached, the plant fluctuates between this temperature and a threshold temperature which is about 10° or 20° higher until the energy requirement increases again and the basic load control system can be relieved by the temperature differential control system.

Apart from heating advantages, the rise and fall system within the basic load range also has the advantage that thermostatically operated valves mounted for example on the heater are actuated more frequently, which is necessary to preserve the capacity of these valves to function.

In order to avoid the opening of a mixing valve which connects the feed pipe 2 to the feed line 6, resulting in a spontaneous rise in temperature, the valve 4 is only gradually opened up by means of the motor 24, in fact through a timing relay 26 downstream of the control device, which switches the motor 24 off again in the opening phase after a short period of running. On the one hand, this substantially obviates heating noises and hunting while on the other, it is guaranteed that there is a constant and thorough mixing throughout the entire circuit so that a usable temperature measurement is possible.

The control device is equipped with a time switch for a daytime program with a lower setting at night, or also for a week-end program. Lowering of the thresholds at night or at the week-end can be effected easily by making the temperature differential greater or by lowering the whole temperature level including the basic load.

The example of embodiment described is based on the fact that heating water of a constant temperature is always available and that, according to requirements, this is lowered to a definite temperature level by proportional blending with return water. Alternatively, however, it is also possible so to operate the heating boiler, for example in the case of an electrically operated heating system, that the heating water from the boiler is already at the appropriate feed temperature. In this case, it would be possible to dispense with a mixing valve. Then, the control device 14 would have to be so constructed that it adjusted the supply of energy to the heating boiler at any given time.

Figure 2:
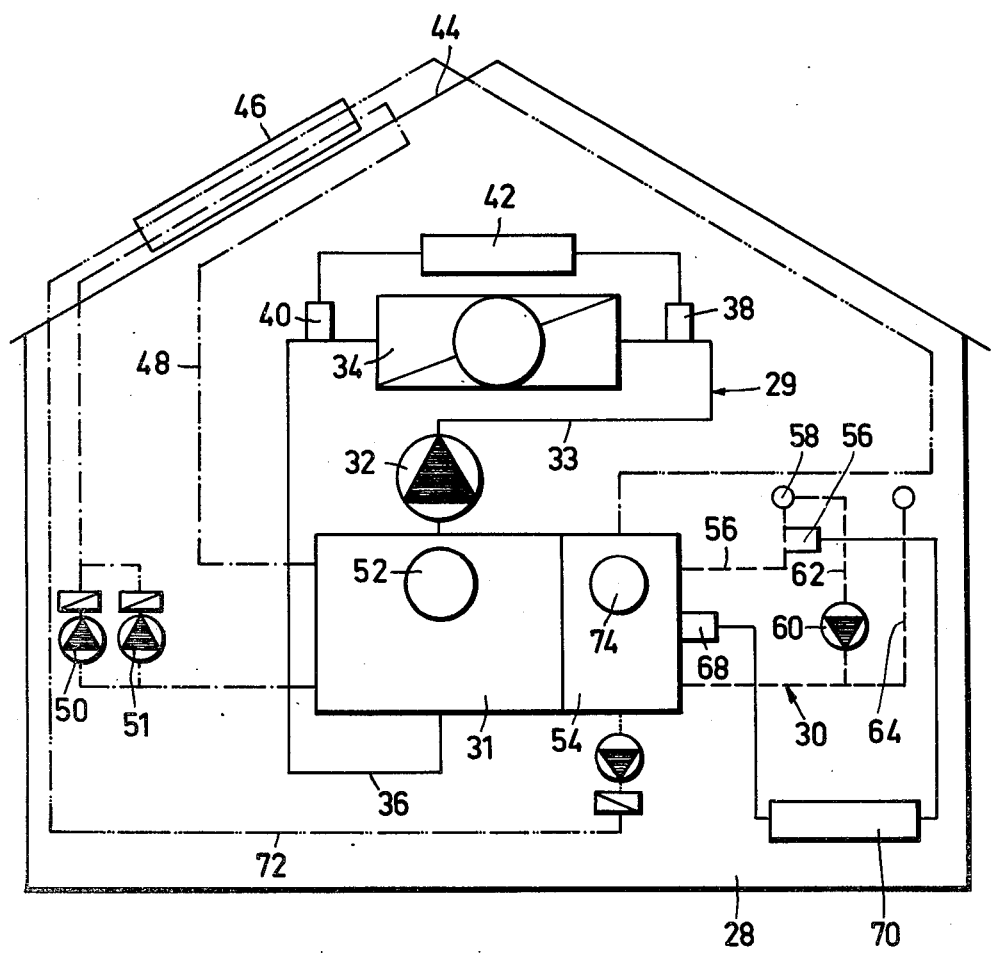
FIG. 2 diagrammatically shows, in part schematically, a central heating plant combined with a utility water production arrangement designed for considerable consumption of hot water, for example for bath installations and in conjunction with swimming pool heating systems.

FIG. 2 shows a building 28 in which, shown in solid lines, there is a heating water circuit 29 and also, shown by broken lines, a utility water circuit 30.

The heating water circuit 29 comprises a heating water storage container 31, a feed line 33 emanating therefrom via a circulating pump 32, one or more consumer units 34 and a return line 36. To ascertain the temperature differential, temperature sensors 38 and 40, connected to a control device 42, are provided in the feed line 33 and also in the return line 36.

To heat up the heating water in the storage container 31, the main energy source is constituted by, mounted on a roof 44 of the building 28, solar cells 46, by which the heating water can be heated directly or indirectly. For this purpose, a heating medium circuit 48 which is operated by a circulating pump 50, passes through the solar cells 46 and through the storage container 31. In the case of a higher heat requirement, a second circulating pump 51, connected in parallel with the first, can increase the rate of flow through the solar cells 46. The circulating pumps 50 and 51 are operated by the control device 42 according to the temperature differential ascertained by the temperature sensors 38 and 40.

Provided as an additional source of energy is a conventionally fired heating boiler 52 which gives off its heat to the heating water contained in the storage container 31 via heat exchanger surfaces not shown in the drawings. The heating water boiler 52 is automatically switched on or off by the control device 42 upon corresponding limit values of the temperature differential, ascertained by the temperature sensors 38 and 40, being attained.

The utility water supply system operates in a manner similar to that of the heating water supply. The utility water circuit 30 comprises a storage container 54, a feed line 56 which leads to a draw-off point 58, and also a return line 62 provided with a circulating pump 60. Discharging into the return line 62 is a supply pipe 64 through which fresh water can be fed when utility water is drawn off. Thermostats 66 and 68 ascertain the temperature differential between feed and return water and transmit their values to an auxiliary control device 70 which automatically switches the secondary energy source on or off, as required. In the same way as in the case of the heating water plant, heating can be effected on the one hand via a circuit 72 passing through the solar cells and on the other via a conventionally fired heating boiler 74 which gives off heat to the heating water contained in the storage container 54 via heat exchanger surfaces, not shown.

Appropriate means of maintaining a minimum temperature can be provided both in the heating water circuit and also in the utility water circuit.

What is claimed is:

1. A method of controlling a space heating system without regard to sensing inside and outside ambient temperature using a constantly circulating heat carrying medium which circulates at a nearly constant rate, the method comprising determining temperature differential measured between feed medium and return medium of the constantly circulating heat carrying medium circulating at the nearly constant rate, regulating temperature of the feed medium as a function of the determined temperature differential measured between the feed medium and the return medium, and limiting lower limit of temperature of the feed medium to a predetermined minimum temperature;

whereby the system is controlled without regard to inside and outside temperature.

2. A method according to claim 1, including, upon reaching the minimum temperature, interrupting temperature differential control based on said differential, and thence raising and lowering feed medium temperature in a predetermined range between the minimum temperature and an adjusted threshold temperature value.

3. A method according to claim 2, including supplying heat from an auxiliary energy source whenever the feed medium minimum temperature is reached, and interrupting said supplying whenever the adjusted threshold temperature is reached.

4. An apparatus for controlling a space heating system having a heat carrying medium constantly circulating in a circuit without sensing inside and outside ambient temperature, the apparatus comprising:

means for circulating said heat carrying medium at a nearly constant rate, first temperature sensing means for determining feed temperature of the constantly circulating medium, second temperature sensing means for determining return temperature of the constantly circulating medium, control means responsive to output from said first and said second temperature sensing means for determining the temperature differential and adjusting feed temperature according to a given temperature differential, and at least one basic load thermostat means responsive to at least feed temperature of the medium coupled to said control means for establishing a minimum temperature of the heat carrying medium;

whereby the system is controlled without regard to inside and outside temperatures.

5. An apparatus according to claim 4, wherein said thermostat means comprises two thermostats located in said circuit, one of said thermostats being responsive to feed temperature of the medium and the other of said thermostats being responsive to return temperature of said medium.

6. An apparatus according to claim 5, wherein said circuit includes return line means and feed line means, and wherein said two thermostats are located respectively in said feed line means and in said return line means.

7. An apparatus according to claim 4, including a four-way mixing valve coupled to said control means via a motor.

8. An apparatus according to claim 7, including a timing means incorporated between said motor and said control means for de-energizing said motor after a given interval.

9. An apparatus according to claim 4, including at least one main energy source and at least one auxiliary energy source, said control means including an auxiliary control device for turning said auxiliary energy source on and off respectively when predetermined bottom and top limit values of actual temperature differential are reached.

10. An apparatus according to claim 9, wherein said main energy source comprises solar cells by means of which the heat carrying medium can be heated, and including a medium storage container in which medium heated by said solar cells is stored, and wherein said auxiliary energy source comprises a conventionally fired boiler for further heating medium in said container.

11. An apparatus according to claim 10, wherein said boiler includes heat exchanger surfaces directly contacting heat carrying medium contained in said storage container.

12. An apparatus according to claim 10, including a second storage container for storing utility heat carrying medium which has been heated by said main energy source, and a further secondary energy source which can be switched on and off as desired to heat additionally medium in said second storage container.

13. An apparatus according to claim 12, including a utility medium circuit having a feed line and also a return line, a second control means, and at least two temperature sensors coupled to said second control means, and a further secondary energy source coupled to said second control means for turning it on and off in response respectively to attaining of limit values of temperature differential.

* * * * *